United States Patent
Miki et al.

(10) Patent No.: US 8,315,318 B2
(45) Date of Patent: Nov. 20, 2012

(54) OFDM SIGNAL TRANSMITTING APPARATUS AND OFDM SIGNAL RECEIVING APPARATUS

(75) Inventors: Nobuhiko Miki, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 399 days.

(21) Appl. No.: 12/530,084

(22) PCT Filed: Mar. 7, 2008

(86) PCT No.: PCT/JP2008/054199
§ 371 (c)(1),
(2), (4) Date: Jan. 6, 2010

(87) PCT Pub. No.: WO2008/108471
PCT Pub. Date: Sep. 12, 2008

(65) Prior Publication Data
US 2010/0183083 A1      Jul. 22, 2010

(30) Foreign Application Priority Data

Mar. 7, 2007  (JP) ............................... P2007-057753

(51) Int. Cl.
*H04L 27/28* (2006.01)
(52) U.S. Cl. ...................................................... 375/260
(58) Field of Classification Search .......... 375/259–260, 375/265, 295, 316, 346, 349; 370/210, 343
See application file for complete search history.

(56) References Cited

U.S. PATENT DOCUMENTS

| | | | |
|---|---|---|---|
| 6,580,705 B1 * | 6/2003 | Riazi et al. | 370/347 |
| 8,107,542 B1 * | 1/2012 | Lou et al. | 375/259 |
| 2002/0191535 A1 * | 12/2002 | Sugiyama et al. | 370/208 |
| 2006/0126591 A1 | 6/2006 | Bysted et al. | |
| 2008/0137716 A1 * | 6/2008 | Lakkis | 375/135 |

FOREIGN PATENT DOCUMENTS

| | | |
|---|---|---|
| EP | 1 811 700 A1 | 7/2007 |
| JP | 07-183862 A | 7/1995 |
| JP | 10-336594 A | 12/1998 |
| JP | 11-215091 A | 8/1999 |
| JP | 2006-501703 A | 1/2006 |
| JP | 2007-081931 A | 3/2007 |
| WO | 2004/015909 A1 | 2/2004 |
| WO | 2005/125018 A1 | 12/2005 |
| WO | 2006/054697 A1 | 5/2006 |

OTHER PUBLICATIONS

Singaporean Office Action for Application No. 2009059049, mailed on Sep. 16, 2010 (9 pages).

(Continued)

*Primary Examiner* — Khanh C Tran
(74) *Attorney, Agent, or Firm* — Osha Liang LLP (57) ABSTRACT

An OFDM signal receiving apparatus (30) includes a receiver section (31) configured to perform receiving processing on a received OFDM signal, for each OFDM symbol duration period; a plurality of deinterleaving sections ($34_1 \ldots 34_n$) each configured to perform deinterleaving processing on data acquired through the receiving processing, in a unit of an interleaving block; and a plurality of decoder sections ($36_1 \ldots 36_n$) each configured to perform decoding processing on data outputted from a corresponding one of the plurality of deinterleaving sections ($34_1 \ldots 34_n$). The interleaving block is a part of a transmission time interval block including data to be transmitted in a transmission time interval.

9 Claims, 6 Drawing Sheets

OTHER PUBLICATIONS

Japanese Office Action for Application No. 2009-502632, mailed on Feb. 8, 2011 (4 pages).

Mexican Office Action for Application No. 2009/009538, mailed on May 18, 2011, with English translation thereof (5 pages).

Office Action in Japanese Patent Application No. 2009-502632 mailed Nov. 9, 2010, with English translation thereof (5 pages).

3GPP TSG-RAN-1 Meeting #28bis, "Reference OFDM Physical Layer Configuration", R1-02-1222, Nortel Networks, Espoo, Finland Oct. 8-9, 2002 (12 pages).

Patent Abstract in Japanese Publication No. 07-183862 Publication date Jul. 21, 1995 (1 page).

3GPP TS 25.212 V7.3.0, "Multiplexing and Channel Coding (FDD)" Technical Specification Group Radio Access Network Dec. 2006 (84 pages).

Japanese Office Action for Application No. 2010-224066, mailed on Jun. 14, 2011 (6 pages).

Shibahara et al., "Performance Evaluation of a Parallel Interference Canceller for FEC-Coded MIMO_OFDM," Technical Report of IEICE, vol. 104, No. 123, pp. 31-35 (5 pages).

Patent Abstracts of Japan, Publication No. 2007-081931, Publication Date: Mar. 29, 2007, 1 page.

Alcatel-Lucent, "Performance Evaluation of Codeblock Based Flexible-Size Channel Interleaving," 3GPP TSG RAN WG1 #49bis, R1-072659; Orlando, USA; Jun. 25-29, 2007, 14 pages.

Alcatel-Lucent, "Flexible-size segmentation for E-UTRA channel interleaving," 3GPP TSG RAN WG1 #49, R1-072046; Kobe, Japan; May 7-11, 2007, 12 pages.

Ericsson, "Design Considerations for Hybrid ARQ Processing Chains," 3GPP TSG-RAN WG1 #48bis, R1-071588; St. Julians, Malta; Mar. 26-30, 2007, 2 pages.

Samsung, "Channel coding and interleaving to enable pipelining in LTE," 3GPP TSG RAN WG1 Meeting #49, R1-072246, Kobe, May 7-11, 2007, 4 pages.

3GPP TS 25.212 V7.3.0, "Multiplexing and channel coding (FDD)," Jun. 2006, 84 pages.

International Search Report issued in PCT/JP2008/054199, mailed on Jun. 3, 2008, with translation, 4 pages.

Office Action for Chinese Patent Application No. 200880007466.7 issued May 16, 2012, with English translation thereof (9 pages).

* cited by examiner

FIG. 6

OFDM SIGNAL TRANSMITTING APPARATUS AND OFDM SIGNAL RECEIVING APPARATUS

TECHNICAL FIELD

The present invention relates to an OFDM signal transmitting apparatus configured to transmit an OFDM signal, and an OFDM signal receiving apparatus configured to receive an OFDM signal.

BACKGROUND ART

In conventional radio communication, in order to make bit reception errors due to fading less likely to occur, interleaving processing has been performed after an error correction encoding processing. In the interleaving processing, sequential coded symbols are assigned to different symbols on a time axis, or to sub-carriers which are as far away as possible from each other on a frequency axis.

For example, a WCDMA system is configured to perform interleaving processing on data to be transmitted in a TTI (Transmission Time Interval), for example, for 20 ms, 60 ms.

Figure 1:
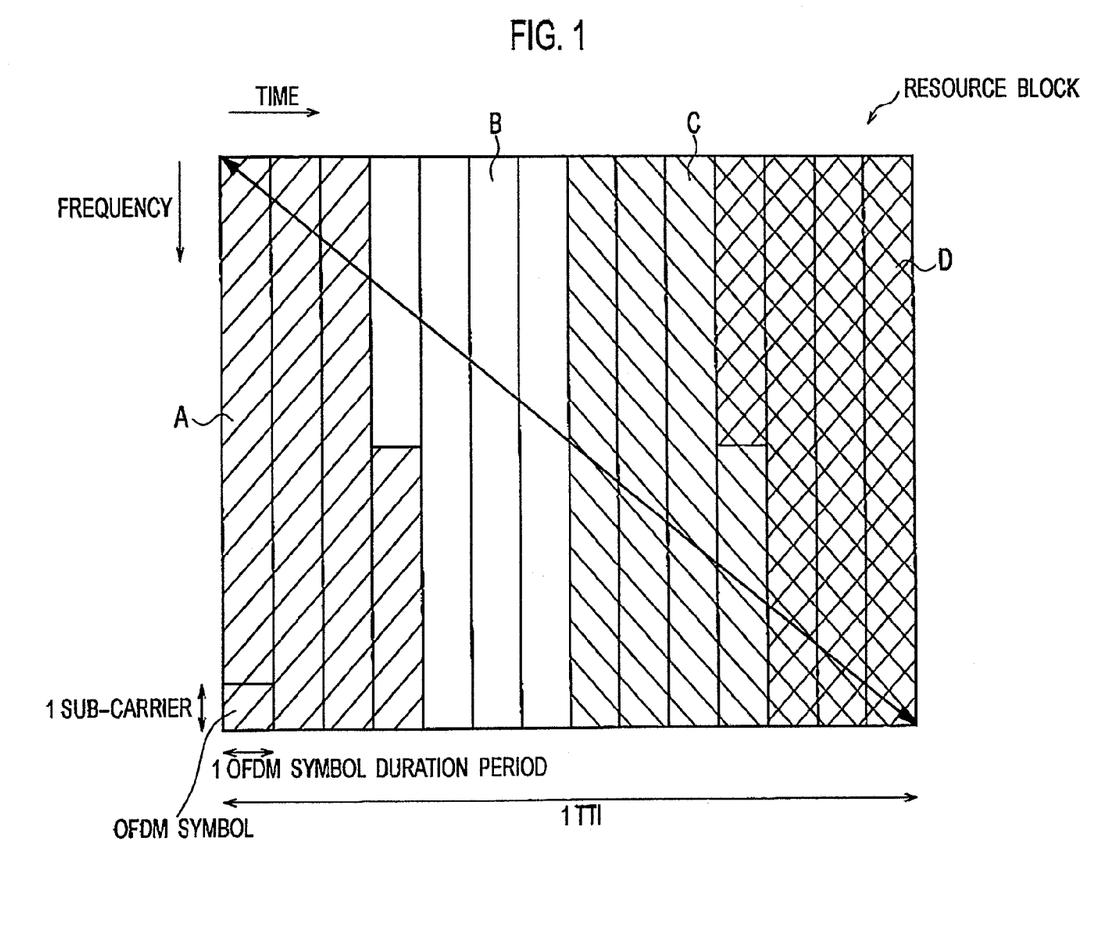
FIG. 1 is a diagram for explaining an operation of an interleaving section of an OFDM signal transmitting apparatus according to a conventional art.

Meanwhile, in the OFDM (Orthogonal Frequency Division Multiplexing), data is transmitted on multiple sub-carriers. Thus, as shown in FIG. 1, the data is allowed to be interleaved in a frequency direction as well as in a time direction. Accordingly, a block of transmission data consisting of all OFDM symbols to be transmitted in each TTI (hereinafter referred to as a transmission time interval block) is used as a unit of interleaving.

Non-patent Document 1: 3GPP TS25.212 V7.3.0 (December, 2006)

DISCLOSURE OF THE INVENTION

The WCDMA system employing the conventional interleaving processing, however, has a problem that a receiving apparatus can not perform deinterleaving processing and decoding processing until receiving all the data contained in a unit of a transmission time interval block, so that a delay in a receiving processing occurs.

Especially in a system such as LTE (Long Term Evolution) which has a strict delay requirement, the processing delay is a problem since its influence is too large to be ignored.

The present invention has been made in view of the above-described problems, and has an object of providing an OFDM signal transmitting apparatus and an OFDM signal receiving apparatus which are capable of shortening delay in receiving processing even when interleaving processing is performed.

A first aspect of the present invention is summarized as an OFDM signal transmitting apparatus configured to transmit an OFDM signal, the OFDM signal transmitting apparatus including: an interleaving section configured to perform interleaving processing in a unit of an interleaving block; and an OFDM signal generator section configured to perform processing of generating an OFDM signal by use of data included in the interleaving block on which the interleaving processing has been performed, and to transmit the OFDM signal thus generated, wherein the interleaving block is a part of a transmission time interval block including data to be transmitted in a transmission time interval.

In the first aspect, the OFDM signal transmitting apparatus can include an encoder section configured to perform coding processing on inputted data in a unit of a coding block, wherein the interleaving block can be the coding block.

In the first aspect, the interleaving block can be a block including data to be transmitted on a predetermined number of sub-carriers in a predetermined number of OFDM symbol duration periods.

A second aspect of the present invention is summarized as an OFDM signal receiving apparatus configured to receive an OFDM signal, the OFDM signal receiving apparatus including: a receiver section configured to perform receiving processing on a received OFDM signal, for each OFDM symbol duration period; a plurality of deinterleaving sections each configured to perform deinterleaving processing on data acquired through the receiving processing, in a unit of an interleaving block; and a plurality of decoder sections each configured to perform decoding processing on data outputted from a corresponding one of the plurality of deinterleaving sections, wherein the interleaving block is a part of a transmission time interval block including data to be transmitted in a transmission time interval.

In the second aspect, an OFDM signal transmitting apparatus can be configured to perform coding processing on inputted data in a unit of a coding block, and the interleaving block can be the coding block.

In the second aspect, the interleaving block can be a block including data to be transmitted on a predetermined number of sub-carriers in a predetermined number of OFDM symbol duration periods.

As described above, the present invention can provide an OFDM signal transmitting apparatus and an OFDM signal receiving apparatus which are capable of shortening delay in receiving processing even when interleaving processing is performed. Consequently, delay can be shortened even during a high-speed transmission period, although an interleaving effect in the time domain reduces.

BEST MODE FOR CARRYING OUT THE INVENTION

OFDM Signal Transmitting Apparatus According to First Embodiment of the Present Invention A description will be given of a configuration of an OFDM signal transmitting apparatus 10 according to a first embodiment of the present invention, with reference to FIG. 2 and FIG. 3.

Figure 2:
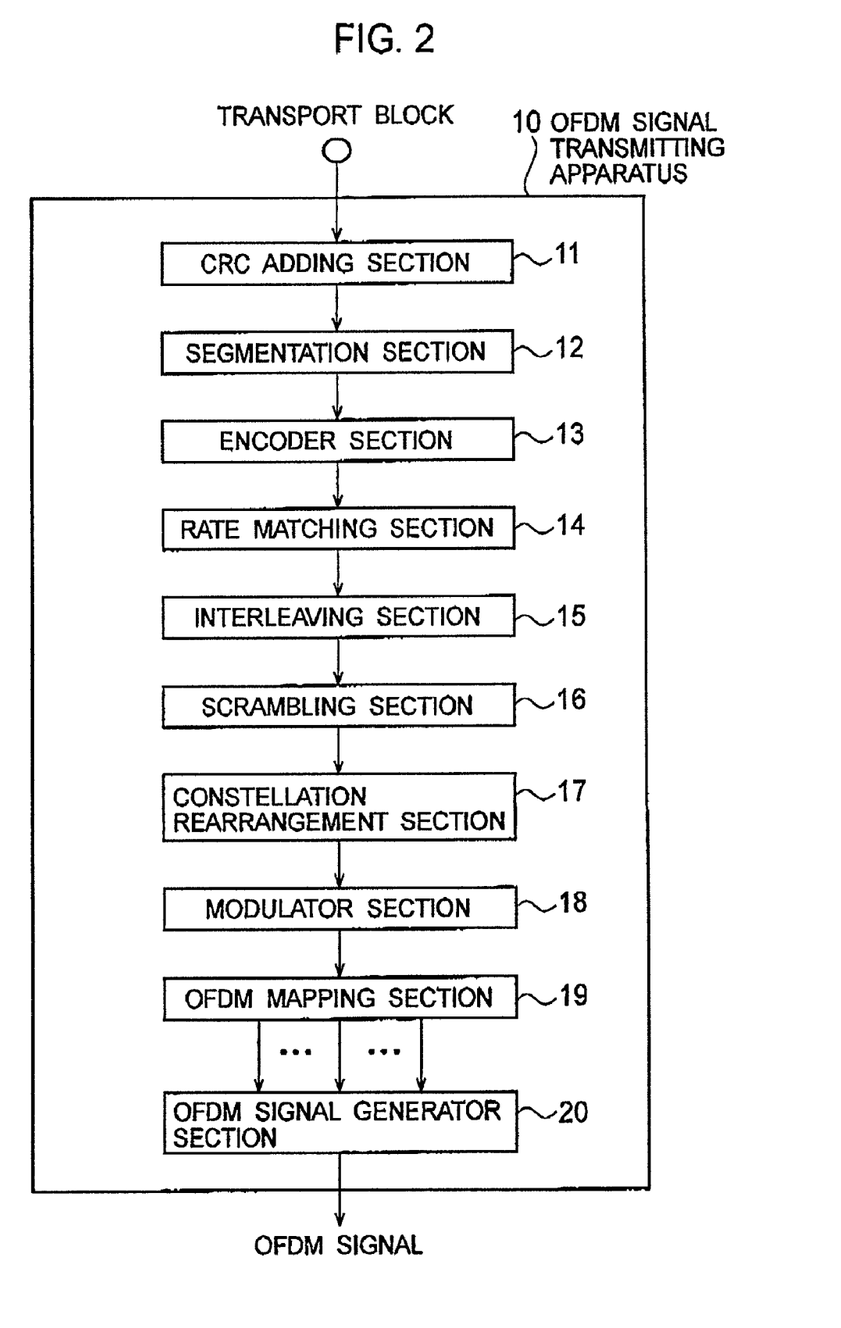
FIG. 2 is a functional block diagram of an OFDM signal transmitting apparatus according to a first embodiment of the present invention.

As shown in FIG. 2, the OFDM signal transmitting apparatus 10 according to the present embodiment includes a CRC adding section 11, a segmentation section 12, an encoder section 13, a rate matching section 14, an interleaving section 15, a scrambling section 16, a constellation rearrangement section 17, a modulator section 18, an OFDM mapping section 19, and an OFDM signal generator section 20.

The CRC adding section 11 is configured to add CRC (Cyclic Redundancy Check) bits to data (a bit string) in a transport block unit, the data inputted by an upper layer.

The segmentation section 12 is configured to segment the data, to which the CRC bits are added, into coding block units.

The encoder section 13 is configured to perform coding processing on the segmented data. Specifically, the encoder section 13 is configured to perform coding processing on the inputted data in a unit of a coding block. As coding processing, convolutional coding processing, turbo coding processing, or the like may be employed, for example.

The rate matching section 14 is configured to perform rate matching processing on the coded data.

The interleaving section 15 is configured to perform interleaving processing on the data on which the rate matching processing has been performed.

Specifically, the interleaving section 15 is configured to perform interleaving processing in a unit of an interleaving block. Here, as shown in FIG. 3, a transmission time interval block is a block consisting of data to be transmittable on all OFDM symbols to be transmitted in a TTI.

Here, the interleaving block is a part of the transmission time interval block consisting of data to be transmitted in each TTI. For example, the interleaving block may be a block (i.e., coding block) including data transmittable on all the OFDM symbols constituting each of blocks A to D shown in FIG. 3.

Figure 3:
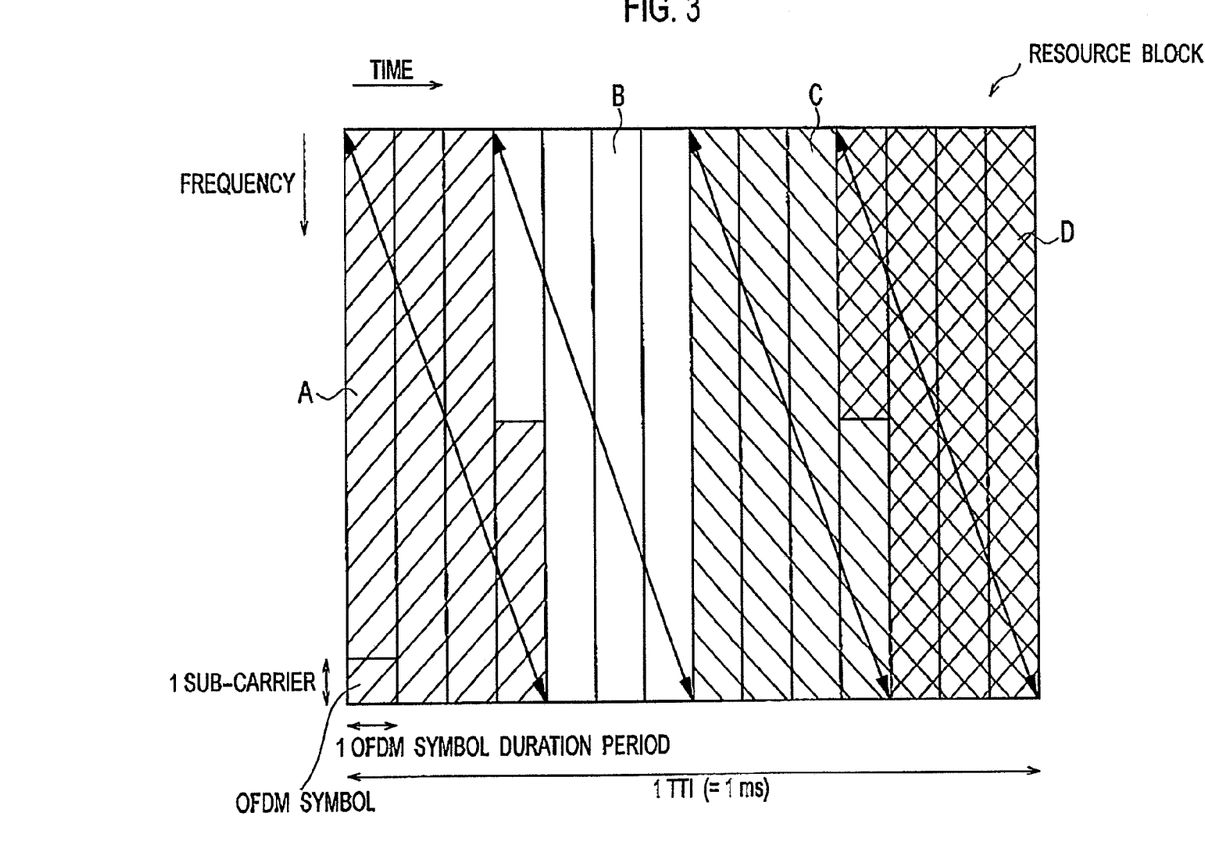
FIG. 3 is a diagram for explaining an operation of an interleaving section of the OFDM signal transmitting apparatus according to the first embodiment of the present invention.

In an example shown in FIG. 3, coding processing is performed on the inputted data in a unit of block consisting of the data transmittable on all the OFDM symbols constituting blocks A to D.

The scrambling section 16 is configured to perform bit-level scrambling processing on the interleaved data (bit string).

The constellation rearrangement section 17 is configured to perform constellation rearrangement processing on the scrambled data. For example, the constellation rearrangement section 17 is configured to add an indicator to the scrambled data, the indicator indicating a sort of constellation arrangement to be used in data modulating processing to be described later.

The modulator section 18 is configured to perform a data modulating processing, such as QPSK, 16QAM or 64QAM, on the data on which the constellation rearrangement processing has been performed.

The OFDM mapping section 19 is configured to map the data-modulated data to OFDM symbols in a resource block assigned to the OFDM signal transmitting apparatus 10. The resource block here is a block which is assigned to the OFDM signal transmitting apparatus 10, and which consists of OFDM symbols transmittable in a TTI.

Specifically, the OFDM mapping section 19 is configured to map the data-modulated data sequentially to OFDM symbols in a symbol duration period from the OFDM symbol corresponding to a sub-carrier having the smallest number.

The OFDM signal generator section 20 is configured to perform OFDM signal generation processing by using the data included in the interleaving block on which interleaving processing has been performed and to transmit the generated OFDM signals.

Specifically, the OFDM signal generator section 20 is configured to generate the OFDM signals by performing Inverse Fast Fourier Transform (IFFT) processing on, and then adding guard intervals to, the data mapped to the OFDM symbols.

It should be noted that the configuration of the OFDM signal transmitting apparatus 10 according to the present invention is not limited to the configuration shown in FIG. 2, and may be a different configuration as far as the configuration includes a function of the interleaving section 15.

(OFDM Signal Receiving Apparatus According to First Embodiment of the Present Invention)

A description will be given of a configuration of an OFDM signal receiving apparatus 30 according to the first embodiment of the present invention, with reference to FIG. 4.

Figure 4:
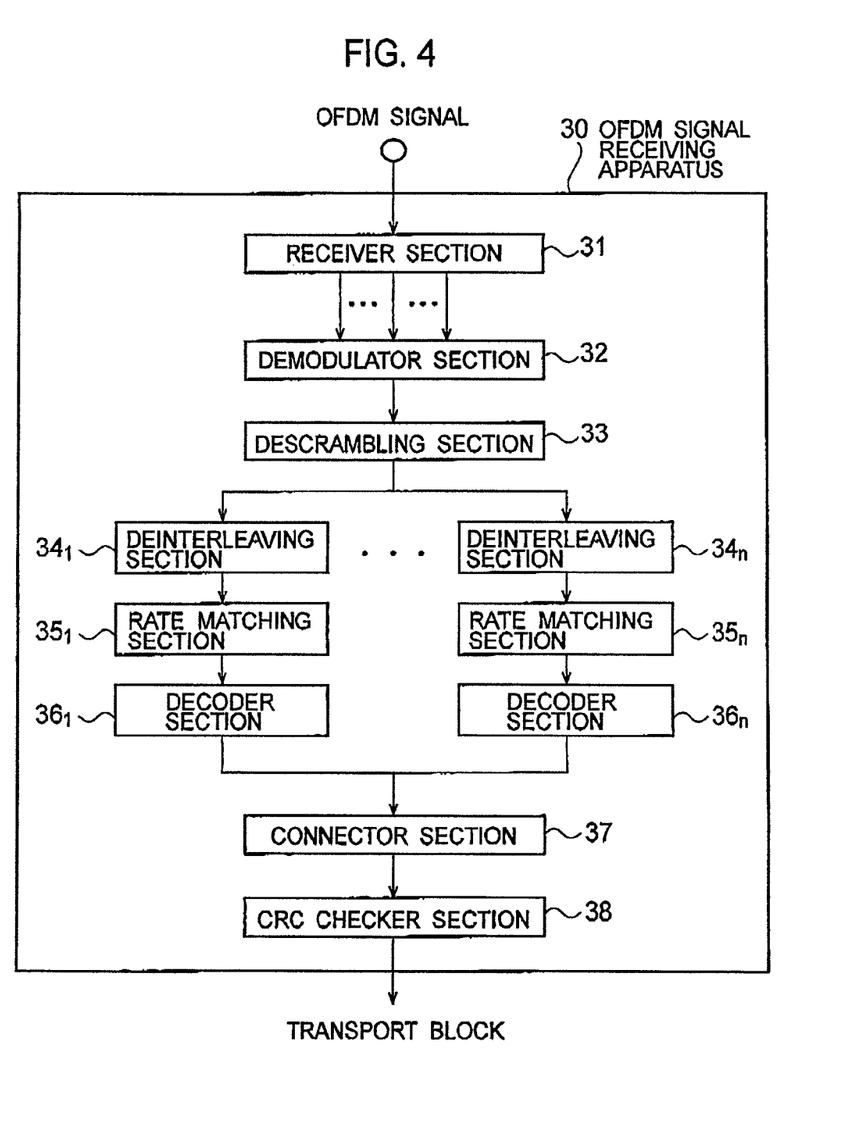
FIG. 4 is a functional block diagram of an OFDM signal receiving apparatus according to the first embodiment of the present invention.

As shown in FIG. 4, the OFDM signal receiving apparatus 30 according to the present embodiment includes a receiver section 31, a demodulator section 32, a descrambling section 33, multiple deinterleaving sections $34_1 \ldots 34_n$, multiple rate matching sections $35_1 \ldots 35_n$, multiple decoder sections $36_1 \ldots 36_n$, a connector section 37, and a CRC checker section 38.

The receiver section 31 is configured to perform receiving processing on a received OFDM signal, for each OFDM symbol duration period.

Specifically, the receiver section 31 is configured to extract the OFDM symbols corresponding to the sub-carriers by deleting guard intervals from the received OFDM signal, and performing parallel-to-serial conversion on, and then performing a Fast Fourier Transform processing on, the received OFDM signal.

The demodulator section 32 is configured to perform demodulation processing on the extracted OFDM symbols for each sub-carrier, and to then perform parallel-to-serial conversion.

Here, the demodulator section 32 may be configured to output the demodulated data in an interleaving block unit to the descrambling section 33. In other words, the demodulator section 32 may be configured to output all data constituting the above-described interleaving block unit to the descrambling section 33 as far as the data has been demodulated, even before all data constituting the above-described transmission time interval block unit is completely demodulated.

The descrambling section 33 is configured to perform descrambling processing on the demodulated data (bit string).

Here, the descrambling section 33 may be configured to output the descrambled data in the above-described interleaving block unit to any one of the multiple deinterleaving sections $34_1 \ldots 34_n$. In other words, the descrambling section 33 may be configured to output all data constituting the above-described interleaving block unit to any one of the multiple deinterleaving sections $34_1 \ldots 34_n$ as far as the data has been descrambled, even before all data constituting the above-described transmission time interval block unit is completely descrambled.

Each of the multiple deinterleaving sections $34_1 \ldots 34_n$ is configured to deinterleave the data outputted from the descrambling section 33, in a unit of an interleaving block described above.

Here, each of the multiple deinterleaving sections $34_1 \ldots 34_n$ may be configured to start deinterleaving processing after receiving all data constituting an interleaving block, from the descrambling section 33. In other words, each of the multiple deinterleaving sections $34_1 \ldots 34_n$ may be configured to deinterleave all data constituting the above-described interleaving block unit, as far as the data has been received, even before all data constituting the above-described transmission time interval block unit is completely received.

Each of the multiple rate matching sections $35_1 \ldots 35_n$ is configured to perform rate matching processing corresponding to the above-described rate matching processing performed by the OFDM signal transmitting apparatus 10, on the data outputted from corresponding one of the multiple deinterleaving sections $34_1 \ldots 34_n$.

Each of the multiple decoder sections $36_1 \ldots 36_n$ is configured to perform decoding processing corresponding to the above-described decoding processing performed by the OFDM signal transmitting apparatus 10, on the data outputted from the corresponding one of the multiple rate matching sections $35_1 \ldots 35_n$.

The connector section 37 is configured to connect together the data outputted from the multiple decoder sections $36_1 \ldots 36_n$.

The CRC checker section 38 is configured to perform error correction processing using the CRC bits added to the data outputted from the connector section 37. The CRC checker section 38 is also configured to delete the CRC bits from the data after the error correction processing, to reconstitute the data (bit string) in the transport block unit, and to transmit the data to the upper layer.

It should be noted that the configurations of the OFDM signal transmitting apparatus 10 and the OFDM signal receiving apparatus 30 according to the present invention are not limited to the above-described configurations, and may be other configurations.

In the above-described embodiment, the OFDM signal transmitting apparatus 10 is configured to separately perform rate, matching processing and interleaving processing respectively by the rate matching section 14 and the interleaving section 15. The OFDM signal transmitting apparatus 10 may, however, be configured to perform rate matching processing including interleaving processing by the rate matching section 14 alone, for example. In this case, the OFDM signal receiving apparatus 30 may as well be configured to perform rate matching processing including a deinterleaving processing by each of the multiple rate matching sections $35a \ldots 35n$.

(Advantageous Effects of OFDM Signal Transmitting Apparatus and OFDM Signal Receiving Apparatus According to First Embodiment of the Present Invention)

The OFDM signal transmitting apparatus 10 and the OFDM signal receiving apparatus 30 according to the present embodiment can perform decoding sequentially and in parallel in an unit of an interleaving block before receiving all data constituting a transmission time interval block, so that delay in receiving processing can be considerably shortened.

Modified Example 1

In a modified example 1, an interleaving block is a block (no matter whether the block is a coding block or not) consisting of data to be transmitted on a predetermined number of sub-carriers in a predetermined number of OFDM symbol duration periods.

In other words, an interleaving section 15 is configured to perform interleaving processing in a unit of a block consisting of data to be transmitted on a predetermined number of sub-carriers in a predetermined number of OFDM symbol duration periods.

Figure 5:
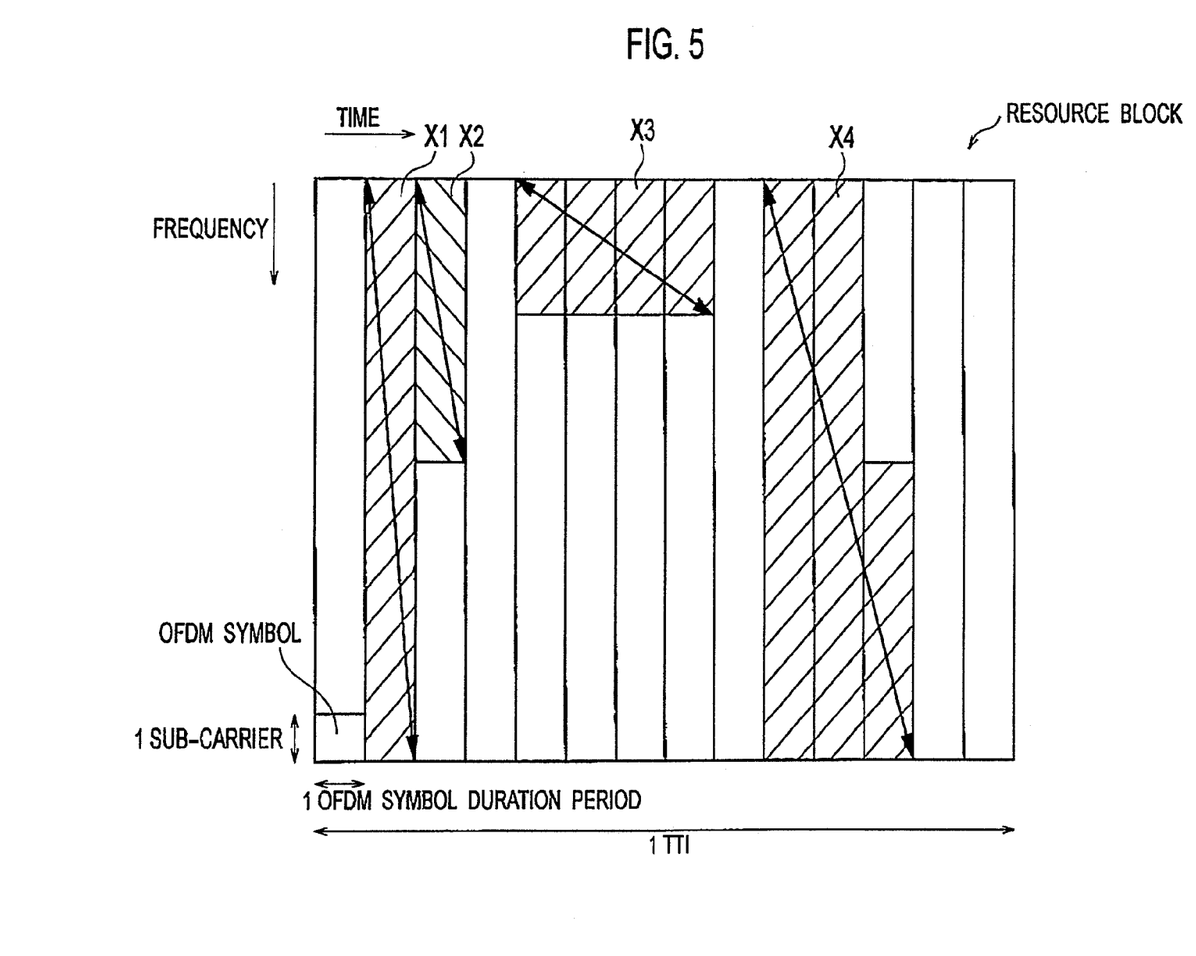
FIG. 5 is a diagram for explaining an operation of an interleaving section of an OFDM signal transmitting apparatus according to a modified example 1 of the present invention.

For example, as shown in FIG. 5, the interleaving section 15 may be configured to perform the interleaving processing in a unit of a block X1 consisting of data to be transmitted on all the sub-carriers in a single OFDM symbol duration period.

Meanwhile, when multiple coding blocks X2 are multiplexed in a single OFDM symbol duration period as shown in FIG. 5, the interleaving section 15 may be configured to perform the interleaving processing in a unit of the coding blocks, or otherwise, may be configured to perform the interleaving processing in a unit of a block including all the coding blocks multiplexed in the OFDM symbol duration period.

Alternatively, the interleaving section 15 may be configured to perform the interleaving processing in a unit of a block X3 or in a unit of a block X4, each consisting of data to be transmitted on a predetermined number of sub-carriers in a predetermined number of OFDM symbol duration periods, irrespective of the coding block unit.

Modified Example 2

Figure 6:
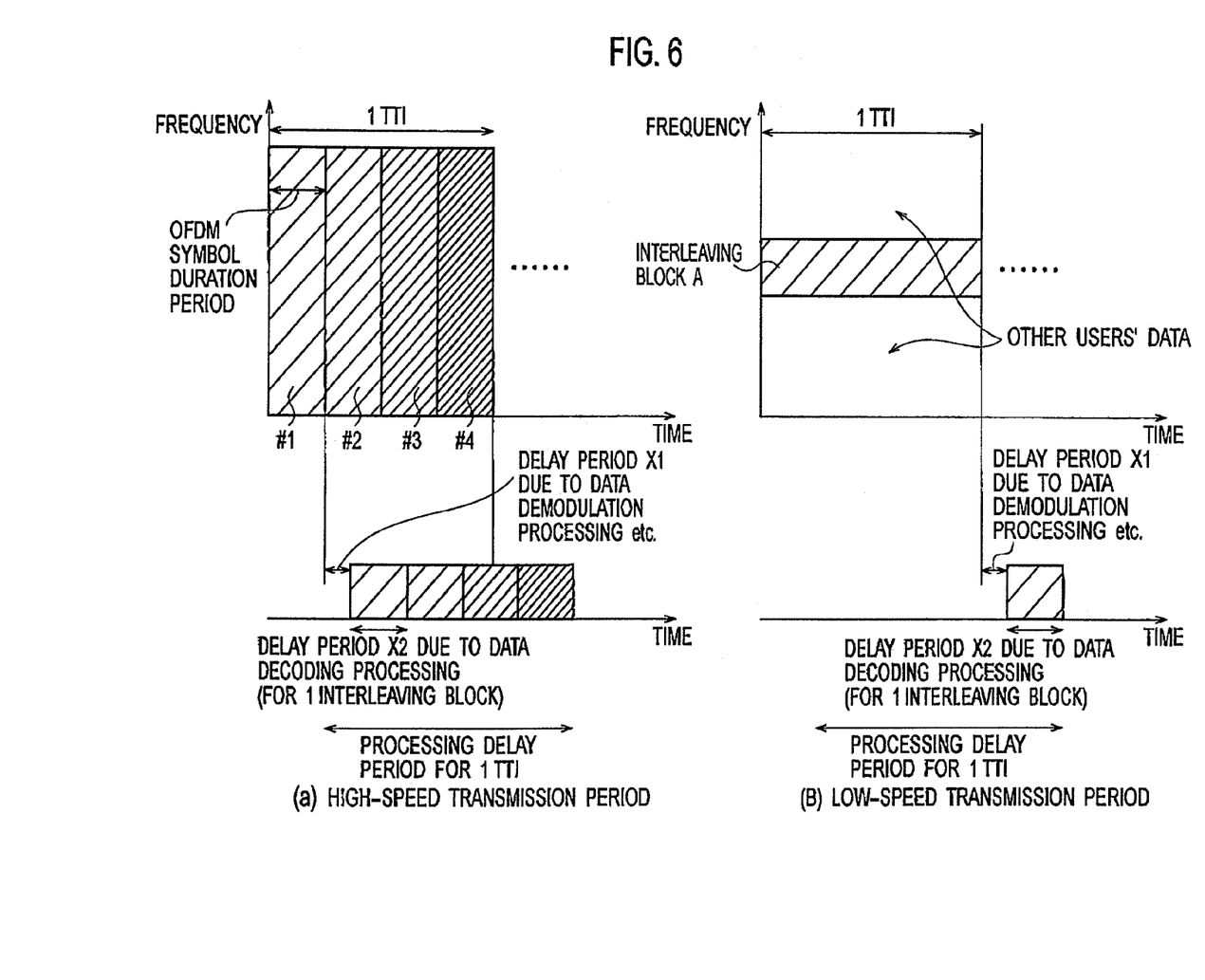
FIG. 6 is a diagram for explaining an operation of an interleaving section of an OFDM signal transmitting apparatus according to a modified example 2 of the present invention.

Referring to FIG. 6, a modified example 2 of the present invention will be described.

In the modified example 2, the interleaving section 15 is configured to perform the interleaving processing in an interleaving block unit consisting of a predetermined number of data pieces. In other words, in the modified example 2, the number of data pieces consisting of each interleaving block is constant irrespective of data transmission rates.

In the modified example 2, as shown in FIG. 6(a), the interleaving section 15 is configured to perform the interleaving processing, for example, in a unit of a block (i.e., for each of interleaving blocks #1 to #4) consisting of data to be transmitted on all the sub-carriers in a single OFDM symbol duration period, in a high-speed transmission period. Therefore, the processing delay in the OFDM signal receiving apparatus 30 can be shortened.

On the other hand, as shown in FIG. 6(b), the interleaving section 15 is configured to perform the interleaving processing throughout a TTI, for example, that is, in a unit of a block (i.e., for an interleaving block A) consisting of data to be transmitted on a predetermined number of sub-carriers in a TTI, in a low-speed transmission period. Therefore, an effect of interleaving in the time domain can be obtained without any increase in the processing delay.

Here, defined as a "high-speed transmission period" is a case of transmitting data transmittable in a TTI on all the OFDM symbols constituting the four interleaving blocks #1 to #4 as shown in FIG. 6(a), while defined as a "low-speed transmission period" is a case of transmitting data transmittable in a TTI on all the OFDM symbols constituting a single interleaving block A as shown in FIG. 6(b).

As shown in FIG. 6(a), in the high-speed transmission period, the OFDM signal receiving apparatus 30 finishes receiving processing for data transmitted in a TTI, after a lapse of a delay period after reception of a transmission time interval block. Here, the delay period is obtained by adding a "delay period X1 due to data demodulation processing or the like" and a "delay period X2 due to data decoding processing".

Meanwhile, as shown in FIG. 6(b), in the low-speed transmission period as well, the OFDM signal receiving apparatus 30 finishes receiving processing of data transmitted in a TTI, after a lapse of a delay period after reception of a transmission time interval block. Here, the delay period is obtained by adding a "delay period X1 due to data demodulation processing or the like" and a "delay period X2 due to data decoding processing."

Accordingly, the delay period in the receiving processing by the OFDM signal receiving apparatus 30 is the same in duration both in the high-speed transmission period and in the low-speed transmission period. Here, the delay period X2 due to data decoding processing is assumed to have the same duration as that of 1 OFDM symbol duration period.

As a consequence, in a HARQ (Hybrid Automatic Repeat Request) process by which the OFDM signal transmitting apparatus 10 and the OFDM signal receiving apparatus 30 operate, a RTT (Round Trip Time) having a short and constant duration can be set independently of the transmission rate.

Although the present invention has been described above in detail by using the embodiment, it is obvious to those skilled in the art that the present invention is not limited to the embodiment described herein. The present invention may be implemented by a modified form or a changed form without departing from the spirit or scope of the present invention defined by the scope of claims. Accordingly, it is to be understood that the description of the present embodiment is made for the purpose of illustration only and has no restrictive meanings on the present invention.

It should be noted that the entire content of Japanese Patent Application No. 2007-057753 (filed on Mar. 7, 2007) is incorporated herein by reference.

INDUSTRIAL APPLICABILITY

As described above, the OFDM signal transmitting apparatus and the OFDM signal receiving apparatus according to the present invention can provide an OFDM signal transmitting apparatus and an OFDM signal receiving apparatus which are capable of shortening delay in receiving processing even when interleaving processing is performed. Consequently, the OFDM signal transmitting apparatus and the OFDM signal receiving apparatus according to the present invention are useful as being able to shorten delay even in a high-speed transmission period, although an interleaving effect in a time region reduces.

The invention claimed is:

1. An OFDM signal transmitting apparatus configured to transmit an OFDM signal, the OFDM signal transmitting apparatus comprising:
    an encoder section configured to perform coding processing on data in a unit of a coding block;
    an interleaving section configured to perform interleaving processing on the data of which the coding processing has been performed in the encoder section, in a unit of an interleaving block; and
    an OFDM signal generator section configured to perform processing of generating an OFDM signal by use of data included in the interleaving block on which the interleaving processing has been performed, and to transmit the OFDM signal thus generated,
    wherein
        the interleaving block is a part of a transmission time interval block including data to be transmitted in a transmission time interval and a coding block obtained after coding, and
        the OFDM signal generator section maps the data included in the interleaving block in the order from a sub-carrier at a lower frequency side, and when mapping of the data included in the interleaving block is ended at a particular sub-carrier in the middle, starts mapping data included in a next interleaving block, for an identical OFDM signal receiving apparatus, for a sub-carrier at a higher frequency side of the particular sub-carrier in the middle.

2. The OFDM signal transmitting apparatus according to claim 1, wherein the size of the interleaving block is unrelated to the number of sub-carriers included in an OFDM symbol.

3. An OFDM signal receiving apparatus configured to receive an OFDM signal, the OFDM signal receiving apparatus comprising:
    a receiver section configured to perform receiving processing on a received OFDM signal, for each OFDM symbol duration period;
    a plurality of deinterleaving sections each configured to perform deinterleaving processing on data acquired through the receiving processing, in a unit of an interleaving block; and
    a plurality of decoder sections each configured to perform decoding processing on data outputted from a corresponding one of the plurality of deinterleaving sections,
    wherein
        the interleaving block is a part of a transmission time interval block including data to be transmitted in a transmission time interval, and is a coding block obtained after coding, and
        the OFDM signal transmitting apparatus is configured to perform coding processing on the inputted data, in a unit of a coding block, maps the data included in the interleaving block in the order from a sub-carrier at a lower frequency side, and when mapping of the data included in the interleaving block is ended at a particular sub-carrier in the middle, starts mapping data included in a next interleaving block, for an identical OFDM signal receiving apparatus, from a sub-carrier at a higher frequency side of the particular sub-carrier in the middle.

4. The OFDM signal receiving apparatus according to claim 3, wherein the interleaving block is a block including data to be transmitted on a predetermined number of sub-carriers in a predetermined number of OFDM symbol duration periods.

5. A method of transmitting an OFDM signal, comprising:
    a step of performing coding processing on data in a unit of a coding block;
    a step of performing interleaving processing on the data on which the coding processing has been performed, in a unit of an interleaving block: and
    a step of performing processing of generating an OFDM signal by use of data included in the interleaving block and transmitting the OFDM signal thus generated,
    wherein
        the interleaving block is a part of a transmission time interval block including data to be transmitted in a transmission time interval and a coding block obtained after coding, and
        in the transmitting step, the data included in the interleaving block is mapped in the order from a sub-carrier at a lower frequency side, and when mapping of the data included in the interleaving block is ended at a particular sub-carrier in the middle, mapping of data included in a next interleaving block, for an identical OFDM signal receiving apparatus, is started from a sub-carrier at a higher frequency side of the particular sub-carrier in the middle.

6. A communication system, comprising:
    an OFDM signal transmitting apparatus configured to transmit an OFDM signal; and
    an OFDM signal receiving apparatus configured to receive the OFDM signal from the OFDM signal transmitting apparatus,
    wherein the OFDM signal transmitting apparatus comprises:
        an encoder section configured to perform coding processing on data in a unit of a coding block;

an interleaving section configured to perform interleaving processing on the data on which the coding processing has been performed in the encoder section, in a unit of an interleaving block; and an OFDM signal generator section configured to perform processing of generating an OFDM signal by use of data included in the interleaving block on which the interleaving processing has been performed, and to transmit the OFDM signal thus generated, wherein the interleaving block is a part of a transmission time interval block including data to be transmitted in a transmission time interval and a coding block obtained after coding, and the OFDIM signal generator section maps the data included in the interleaving block in the order from a sub-carrier at a lower frequency side, and when mapping of the data included in the interleaving block is ended at a particular sub-carrier in the middle, starts mapping data included in a next interleaving block, for an identical OFDM signal receiving apparatus, from a sub-carrier at a higher frequency side of the particular sub-carrier in the middle.

7. An OFDM signal receiving apparatus configured to receive an OFDM signal, the OFDM signal receiving apparatus comprising:

a receiver section configured to receive an OFDM signal generated by use of data included in an interleaving block, the data having been obtained through coding processing in a unit of a coding block and through interleaving processing in a unit of the interleaving block; and a processing section configured to process the OFDM signal received in the receiver section, wherein the interleaving block is a part of a transmission-time interval block including data to be transmitted in a transmission time interval, and the size of the interleaving block is the same as the size of the coding block obtained after coding, and in the OFDM signal received in the receiver section, the data included in the interleaving block is mapped in the order from a sub-carrier at a lower frequency side, and when mapping of the data included in the interleaving block is ended at a particular sub-carrier in the middle, mapping of the data included in a next interleaving block, for an identical OFDM signal receiving apparatus, is started from a sub-carrier at a higher frequency side of the particular sub-carrier in the middle.

8. The OFDM signal receiving apparatus according to claim 7, wherein the size of the interleaving block is unrelated to the number of sub-carriers included in an OFDM symbol.

9. A receiving method of receiving an OFDM signal, comprising:

a step of receiving an OFDM signal generated by data included in an interleaving block, the data having been obtained through coding processing in a unit of a coding block and through interleaving processing in a unit of the interleaving block: and a step of processing the received OFDM signal, wherein the interleaving block is a part of a transmission time interval block including data to be transmitted in a transmission time interval, and the size of the interleaving block is the same as the size of the coding block obtained after coding, and in the OFDM signal received in the receiving step, the data included in the interleaving block is mapped in the order from a sub-carrier at a lower frequency side, and when mapping of the data included in the interleaving block is ended at a particular sub-carrier in the middle, mapping of the data included in a next interleaving block, for an identical OFDM signal receiving apparatus, is started from a sub-carrier at a higher frequency side of the particular sub-carrier in the middle.

\* \* \* \* \*